United States Patent [19]

Klees

[11] 4,291,782
[45] Sep. 29, 1981

[54] SIMPLIFIED METHOD AND APPARATUS FOR HOT-SHIELD JET NOISE SUPPRESSION

[75] Inventor: Garry W. Klees, Mercer Island, Wash.

[73] Assignee: The Boeing Company, Seattle, Wash.

[21] Appl. No.: 89,693

[22] Filed: Oct. 30, 1979

[51] Int. Cl.³ .............................................. F02K 1/00
[52] U.S. Cl. .............................. 181/215; 239/265.13; 239/265.25; 239/265.33
[58] Field of Search ....................... 181/213, 215–217, 181/219–222; 60/226 R, 226 A, 324, 273–274, 694–697, 262–264; 239/265.13, 265.25, 265.33

[56] References Cited

U.S. PATENT DOCUMENTS

| | | | |
|---|---|---|---|
| 2,931,169 | 4/1960 | Glenn | 181/215 X |
| 2,979,900 | 4/1961 | Hopper | 60/262 X |
| 2,990,905 | 7/1961 | Lilley | 181/220 |
| 3,027,710 | 4/1962 | Maytner | 181/213 X |
| 3,032,981 | 5/1962 | Lawler | 239/265.13 |
| 3,069,848 | 12/1962 | Griffith | 60/226 R |
| 3,174,282 | 3/1965 | Harrison | 181/220 X |
| 3,187,501 | 6/1965 | Quick | 60/264 X |
| 3,333,772 | 8/1967 | Bruner | 239/265.13 |
| 3,347,467 | 10/1967 | Carl et al. | 239/265.13 |
| 3,393,518 | 7/1968 | Bridge | 60/226 R |
| 3,463,402 | 8/1969 | Langston, Jr. | 239/265.13 |
| 3,527,317 | 9/1970 | Motsinger | 181/221 X |
| 3,599,749 | 8/1971 | Millman | 181/220 |
| 3,618,701 | 11/1971 | Macdonald | 181/221 |
| 3,711,013 | 1/1973 | Tontini et al. | 181/220 X |
| 3,726,091 | 4/1973 | Tontini | 181/220 X |

FOREIGN PATENT DOCUMENTS 1157063 5/1958 France .
859994 1/1961 United Kingdom ................ 181/215

OTHER PUBLICATIONS

Cowan et al., "Transmission of Sound Through a Two-Dimensional Shielding Jet", AIAA Paper No. 73-1002, Oct. 15, 1973.

Primary Examiner—George H. Miller, Jr.
Assistant Examiner—Thomas H. Tarcza
Attorney, Agent, or Firm—Ronald E. Suter; Bernard A. Donahue

[57] ABSTRACT

A method and apparatus for selectively generating a noise suppressing hot gas shield are described. A portion of the jet engine exhaust flow is selectively directed to a nozzle which at least partially surrounds the circumference of the jet engine exhaust. Prior to exiting the nozzle the flow is passed through a pressure, and therefore density, loss producing device to provide a shield flow of optimum noise suppression properties.

13 Claims, 17 Drawing Figures

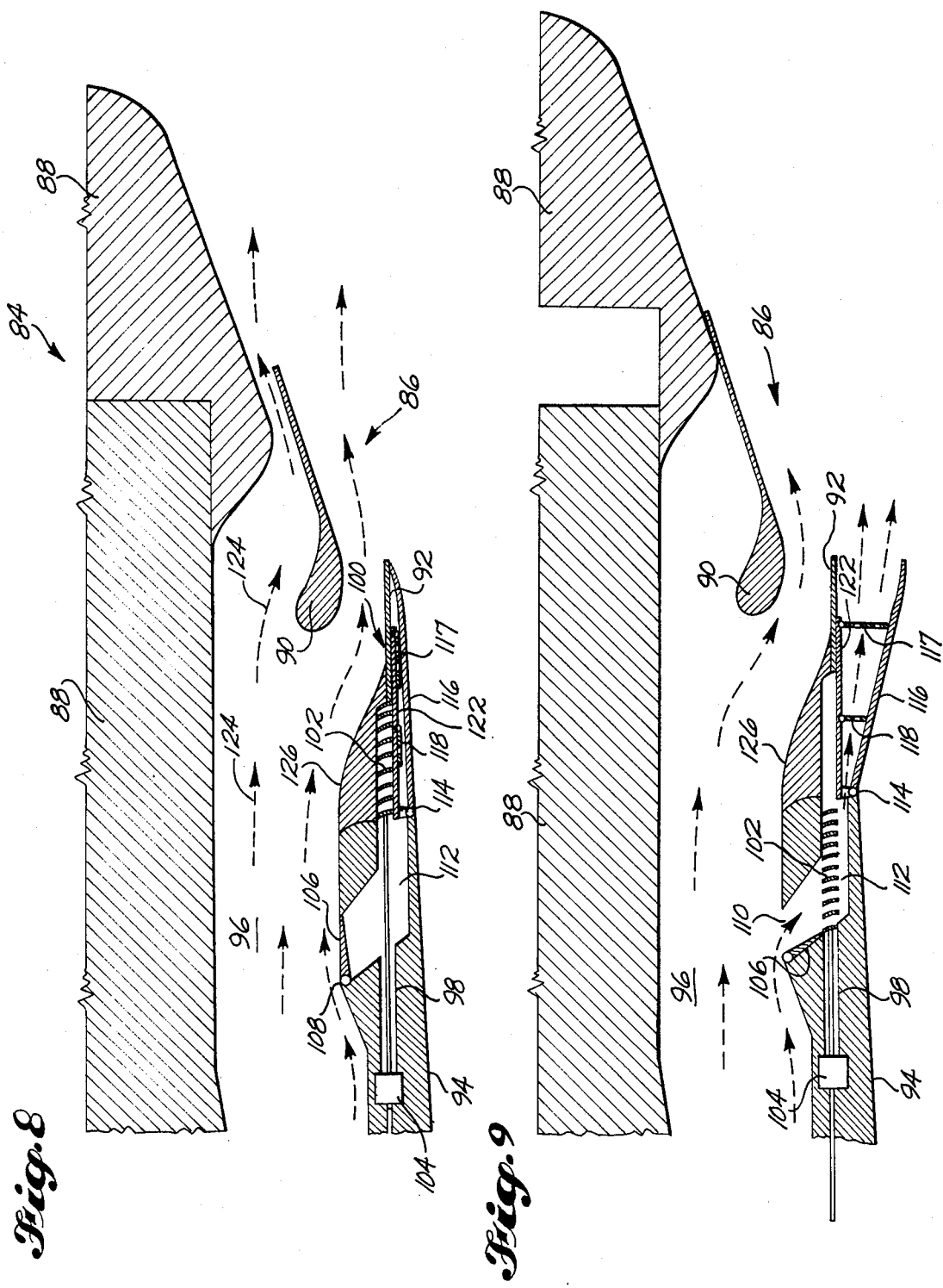

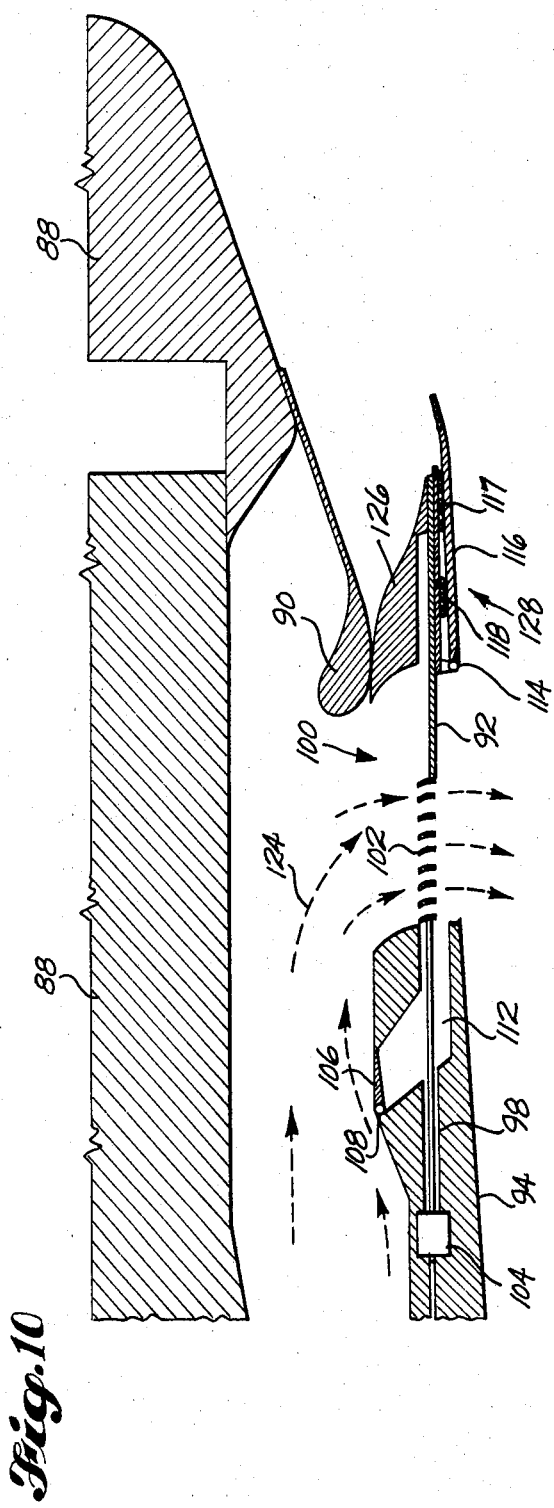

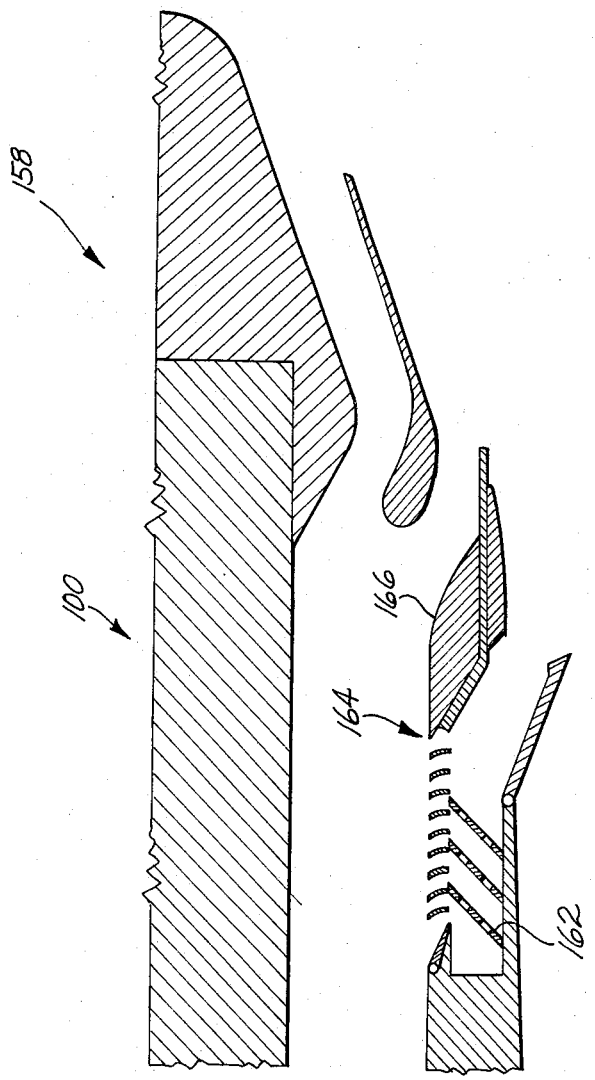

SIMPLIFIED METHOD AND APPARATUS FOR HOT-SHIELD JET NOISE SUPPRESSION

BACKGROUND OF THE INVENTION

1. Field of the Invention

This invention relates generally to the field of noise suppression and, more particularly, to the suppression of jet noise by means of a hot gas shield. Although this invention finds particularly useful application in the suppression of noise from a supersonic aircraft, it is expressly to be understood that the advantages of the invention are equally well manifest in other types of jet aircraft and other fields wherever and whenever similar conditions and problems exist, for example, in subsonic or transonic jet engine applications.

2. Background of the Invention

Increasing public awareness of and attention to environmental quality has generated an ongoing regulatory process intended to decrease the level of permissible noise in the environment. One area of concern in this process is the intense noise that may be generated by jet aircraft when they are close to the ground, particularly on take-off and climb. While this problem has plagued both the aircraft industry and the public since the introduction of jet aircraft, increased attention recently has been focused on the problem by the introduction of supersonic transport aircraft (SST). The problem is rapidly reaching a point at which noise regulations could seriously delay, if not entirely preclude, technological advancement in the field. The instant invention offers a technically acceptable, environmentally sound solution to this problem.

Many different approaches to the problem have been suggested including acoustic linings of various types, internal mixers, multi-tube nozzles, ejector rings and noise-optimized engine performance parameters. Although many of these proposals have been effective to reduce or suppress noise to some degree, they generally have not achieved the desired reductions and have frequently produced significant weight and/or performance penalties.

Another proposal, more closely related to the instant invention, is the suggestion of a hard, or mechanical shield, extending a distance downstream of the engine exit sufficient to significantly affect the noise level perceived by a ground observer. This approach proved to be generally impractical because of added weight as well as drag penalties, if the shield remained deployed during cruise when noise suppression was not necessary. Attempts to provide a hard shield that would retract at cruise failed due to the complexity and added weight of the retracting mechanism. Also, the hard shield could not totally be made acoustically reflective, allowing some noise to reach the observer.

Although the refraction and reflection effects of the fluid media through which sound waves travel have long been recognized, as evidenced by Lord Raliegh's *Theory of Sound* published in 1878, few practical applications of these effects have been proposed. However, it has recently been suggested that a fluid shield could have noise suppression properties similar to those of a hard shield without the associated drag penalty. While the sound suppression potential of a fluid shield generally has been confirmed, attempts to create a practical generator which produces a shield having the desired sound attenuation properties have met with little success. Because optimum shield temperatures are believed to be relatively high, it has been suggested that additional burners could be used to generate a shield layer. Once again unacceptable weight penalties result from the fuel required by the burners as well as the burner structures themselves. Another proposal suggests ducting the hot turbine air outside the cooler fan air to produce a shielding effect. This so-called "inverted flow" engine does, to some extent, reduce noise, but at a significant loss in thrust from the flow inversion process. Additionally, other shield properties such as shield geometry, pressure ratio and velocity are not necessarily optimized in the inverted flow engine. Another approach suggests producing a shield having sound suppression and/or absorption properties due to its lower molecular weight which is caused by introducing a material, e.g., water vapor, into the air stream. This obviously requires added weight to be carried in the form of a water supply, conduit and injector mechanisms. A related concept suggests the injection of a gas such as helium to create a fluid layer having noise suppression properties. This approach also suffers from the disadvantages of added weight due to generator supplies, such as storage tanks, conduit, etc., as well as the necessity of estimating and transporting sufficient quantities of the gas for an entire mission.

It is, accordingly, an object of the present invention to provide a method and apparatus for generating a noise attenuating fluid shield that is not subject to these and other disadvantages and limitations of the prior art.

It is another object of the invention to provide a method and apparatus for generating a noise suppressing fluid shield that ulitizes engine exhaust air appropriately conditioned or modified to produce a shield having near-optimum noise suppression parameters.

It is a further object of the invention to provide a method and apparatus for generating a fluid shield that is lightweight, simple in operation, requires few moving parts and therefore is easily adapted to a variety of jet engines.

It is yet another object of the invention to provide a fluid shield generating method and apparatus that redirects engine exhaust air and reduces the pressure thereof to produce an appropriately located shielding layer.

SUMMARY OF THE INVENTION

Briefly, these and other objects are achieved in accordance with aspects of an example of the present invention in which pressure loss producing means are provided in a selectively operable shield generating nozzle, which is located adjacent the exhaust nozzle exit and which extends at least partially around the circumference of said exit. A portion of the exhaust flow from the engine is selectively permitted to enter the nozzle duct, pass through the loss producing means and then pass out of the nozzle exit to produce a fluid layer having the desired noise attenuation properties. Preferably only portions of the boundary layer of the hot exhaust flow are utilized for shield production so as to minimize thrust loss. As the flow passes through the loss producing means, a pressure and corresponding density change occurs, to thereby condition the flow for optimum noise attenuation properties.

Further details of these and other novel features and their operation and cooperation as well as additional objects and advantages of the invention will become apparent and be best understood from a consideration of the following description taken in connection with the accompanying drawing which is provided by way of illustrative example only.

DESCRIPTION OF THE DRAWINGS

FIGS. 3–5 illustrates an application of the invention to a jet engine wherein:

FIG. 3 is a side view of the shield in its open, operative condition;

FIG. 4 is an end view of the engine of FIG. 3 taken along lines 4—4; and

FIG. 5 is a view similar to FIG. 4, with the generator in its closed cruise position.

FIGS. 6–7 illustrate the shield generator of the invention applied to an inverted-flow engine wherein:

FIG. 6 shows the generator in its operative position; and

FIG. 7 shows the inoperative cruise position.

FIGS. 8–13 illustrate yet another application of the inventive shield generator wherein:

FIG. 8 illustrates the open, operative position of the shield;

FIG. 9 illustrates the closed generator position for supersonic cruise;

FIG. 10 illustrates the engine of FIGS. 8–9 in the thrust reverse position; and

FIGS. 11–13 schematically illustrate one type of actuating and latching mechanism that may be used to achieve the nozzle and shield generator configuration illustrated in FIGS. 8–10.

FIG. 14 illustrates another application of the generator of the invention.

DETAILED DESCRIPTION OF THE PREFERRED EMBODIMENTS

Figure 1:
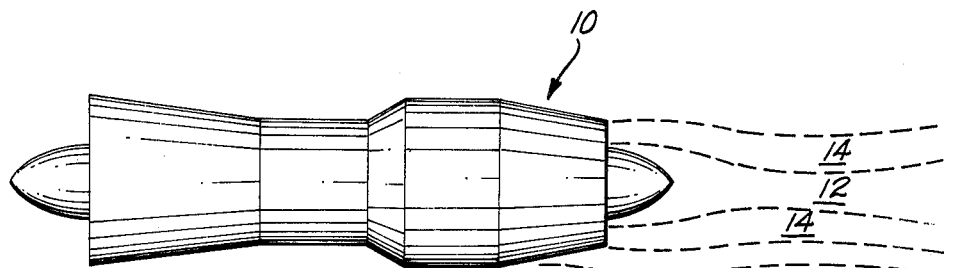
FIG. 1 is a schematic illustration of a jet exhaust flow and fluid acoustic shield.

With specific reference now to the figures in detail, it is stressed that the particulars shown are by way of example and for purposes of illustrative discussion only and are presented in the cause of providing what is believed to be the most useful and readily understood description of the principle concepts of the invention. In this regard, no attempt is made to show or discuss structural details of the apparatus in more detail than is necessary for a fundamental understanding of the invention. The description taken with the drawing will make it apparent to those skilled in the art how the several forms of the invention may be embodied in practice. Specifically, the detailed showing is not to be taken as a limitation upon the scope of the invention which is defined by the appended claims forming, along with the drawing, a part of this specification.

FIG. 1 provides a greatly simplified illustration of the basic fluid shield concept. The flow from a jet exhaust, generally designated 10, includes a region of hot primary of core air, generally designated 12, usually emanating from the central region of exhaust 10. Additionally, a turbofan engine will include an annular region of cooler, fan or secondary air, generally designated 14, disposed about core flow 12. Of course, in a so-called inverted flow engine, the relative positions of core air 12 and fan air 14 would be reversed. As is known, the general gas shield concept suggests the provision of an additional, or tertiary flow, generally designated 16, at least part way around flows 12 and 14, to provide a fluid shield or suppressor layer between the engine exhaust 12, 14 and an observer (not shown). The properties of fluid layer 16 must be optimized in terms of temperature, pressure and density to reflect, refract and/or partially absorb sound waves caused by exhaust flows 12, 14 and, to some extent, other noise sources of the engine itself. Shield flow 16 may extend around the full circumference of exhaust 10 or any portion thereof, however, it is desirable to leave at least some part of the exhaust flow open to the atmosphere. In the preferred embodiment, that portion of the exhaust generally facing away from ground observers is selected to remain open to the atmosphere.

As previously discussed, prior efforts at producing a practical gas shield generator have met with little success due to the excessive complexity, unacceptable performance penalties and/or added weight associated with their use. Because of the higher temperatures at which an SST engine operates and the fact that there is normally excess thrust available at takeoff, a gas shield may efficiently be created by utilizing a portion of the primary or core flow of such an engine. This flow may be easily tailored to optimum shield conditions and at the same time, may be appropriately positioned by passing it through a duct or nozzle carrying means to reduce its pressure, and therefore, its density.

Because the pressure of the exhaust flow is relatively great, a large pressure loss is necessary if this flow is to be utilized for an acoustic shield. There are several alternative methods available for efficiently creating this loss, one of which is shown in FIGS. 2A–2C.

Figure 2A:
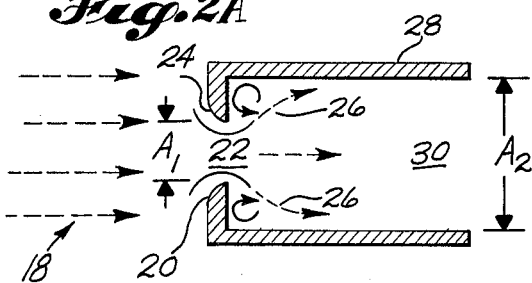
FIGS. 2A–2D illustrate, in simplified form, two of the more simple means for creating a pressure loss in a fluid stream.

In FIG. 2A a fluid flow of pressure $P_s$, represented by arrows 18, impinges against a member 20. Member 20 includes an opening 22, of any desired shape, having a cross-sectional area $A_1$. To insure opening 22 will be completely filled by flow 18 and thereby improve the accuracy of the pressure loss calculations (see infra), it is desirable to round or chamfer edges 24 of opening 22 (see FIG. 2B). After a portion of flow 18 is forced to pass through opening 22 it expands, as represented by arrows 26, within the confines of side wall members 28 which form a passage 30 having a cross-sectional area $A_2$. The pressure drop across member 20 is a predictable function of the ratio $(A_1/A_2)$ between the area of opening 22 and the area of passage 30, along with the Mach number of flow 18 in the opening 22. Flow 26 would thus have a pressure $P_L$, which is lower than $P_S$.

Figure 2D:
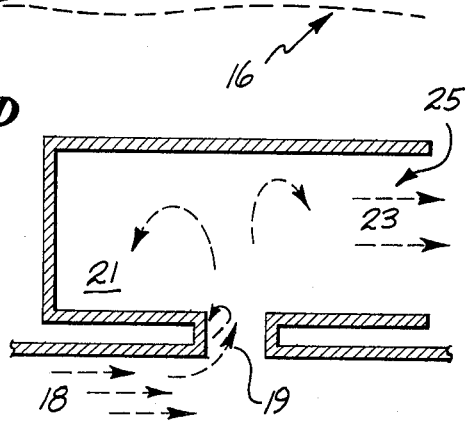
Figure 2B:
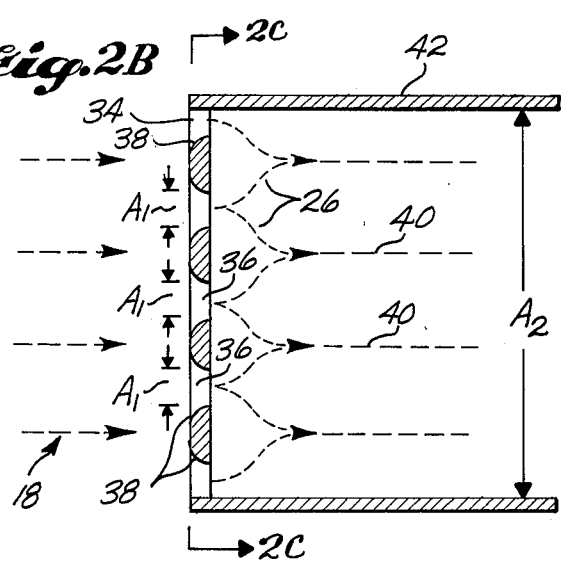
Figure 2C:
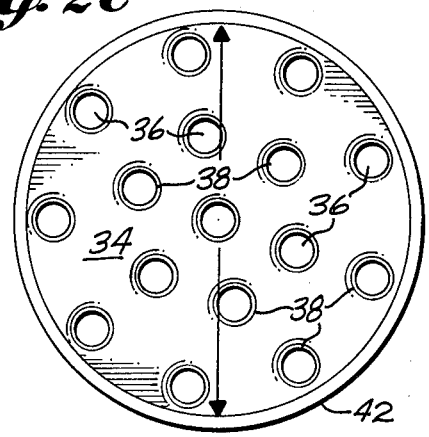

This same predictability may be achieved when a plurality of jump area increases are provided by a plurality of openings as shown in FIGS. 2B and 2C. Once again a flow 18 is shown impinging on a member 34. Member 34 has a plurality of openings 36, each having chamfered edges 38 and a minimum cross-sectional area $A_1$. Once again after flow 18 passes through openings 36 it expands upstream of the duct exit, as illustrated by arrows 26, causing a decrease in pressure and density. Since the flows through adjacent openings 36 effectively form their own barriers 40 through interference, no barriers, such as shown in FIG. 2A, are necessary. Outer walls 42 are provided to confine the expanded flows 26 and define an area $A_2$ therewithin. In this illustration the pressure drop across member 34 may be again predicted from the ratio of the sum of the areas $A_1$, over area $A_2$ and the Mach number of flow 18 at $A_1$.

Another relatively simple means of creating a large pressure loss in a fluid flow is schematically shown in FIG. 2D. In this example the loss is created by turning the flow 18 through one or more openings 19 and dumping the turned flow into one or more plenum chambers 21. The flow 23 emitted from chamber exit 25 would then be at a lower pressure than the flow 18 and could be used to form an acoustic attenuation layer. A pressure loss could also be created by a difffusion process, however, this would approach the jump area process in performance while requiring additional structure.

Figure 3:
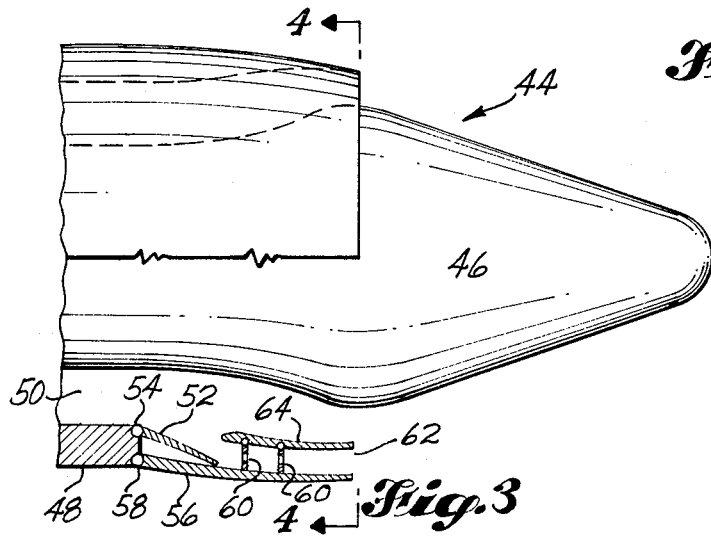
Figure 4:
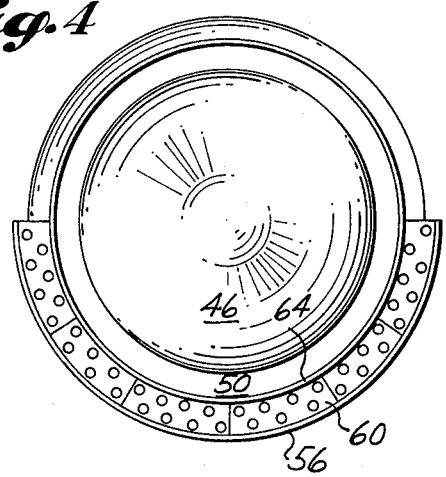
Figure 5:
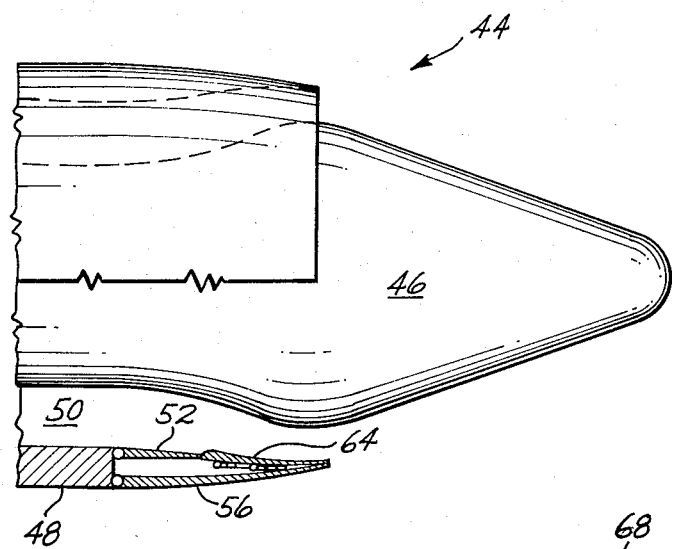

One embodiment for employing the above pressure loss principles in the generation of a effective and practical fluid shield is illustrated in FIGS. 3-5. As seen therein, an exhaust portion, generally designated 44, of a turbojet engine is schematically illustrated. Portion 44 includes a tail plug 46 and an outer casing 48 forming an exhaust duct 50 therebetween. About that portion of the circumference of exhaust duct 50 where a fluid shield is desired, a first door means 52 is provided. Door means 52 is pivotally or otherwise movably attached as at 54, adjacent the inner surface of casing 48. Similarly, a second door means 56 is pivotally or otherwise movably attached as at 58, adjacent the outer surface of casing 48. The pressure loss is created by providing at least one throttle or choke plate 60 upstream of the exit of a shield duct or nozzle 62 formed between door means 56 and a fixed, annular member 64 when door means 56 is in its open, operative position, as shown in FIG. 3. Plates 60 are formed of any high temperature material and have holes 65 provided therethrough. Plates 60 may be pivotally or otherwise retractably mounted to either annular member 64 or door means 56 so that as door means 56 moves to its closed position, plates 60 are simultaneously retracted. As shown in FIG. 4, nozzle 62 extends approximately 180 degrees around the circumference of exhaust duct 50. However, as noted previously, the shield may extend completely around duct 50 or may be left open for some circumferential portion thereof. Depending on the desired circumferential extent of nozzle 62, both door means 52 and 56 could be divided into a plurality of segments which would overlap in both the closed and open positions. As shown in FIG. 5 door means 52 and 56 have been moved to their respective, closed positions and plates 60 have retracted to a stowed, out of the way position between member 64 and door means 56. Any of a variety of conventional actuation and linkage systems may be used for retracting means 52 and 56 and plates 60 such as, for example, a worm gear or fluid cylinder arrangement like that used in conventional thrust reverser arrangements.

Holes or openings 65 may have chamfered edges as discussed with regard to FIGS. 2A-2C. The minimum cross-sectional area of each opening is known, as is the cross-sectional area of nozzle 62 and the Mach number of the flow passing therethrough. From these known quantities the pressure drop across each plate 60 may be calculated. Obviously, if the desired shield pressure and exhaust pressure are known, the size of openings 65 and the number or stages of throttle plates 60 necessary to produce that drop may be determined. Since the pressure drop that may be obtained across any single stage or plate 60, is limited to approximately 35-40%, it may be necessary to provide two or more plates 60 in series, as shown in FIG. 3 depending on the pressure of the flow in duct 50 and the desired pressure of the shield flow.

In operation, when noise suppression is desired, door means 52 and 56 are moved to their open, operative positions as shown in FIG. 3. As the engine exhaust flow moves through duct 50, a portion thereof, generally boundary layer air, tends to follow door means 52 into nozzle 62. As this diverted flow passes through openings 65 in plates 60 its pressure is reduced which, in turn, creates a reduction in its density and exit velocity. As this reduced pressure flow leaves nozzle 62, a gas shielding layer is formed between the exhaust flow through duct 50 and an observer (not shown) to provide the desired noise suppression. When noise suppression is no longer desired, door means 52 and 56 as well as plates 60 are moved to their inoperative position, shown in FIG. 5, to reduce drag and provide a clean cruise profile.

Figure 6:
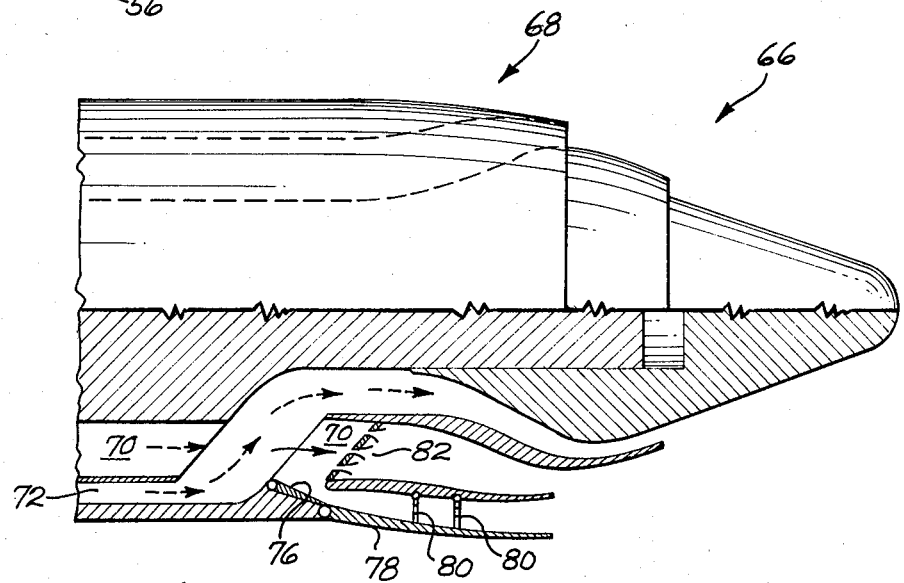
Figure 7:
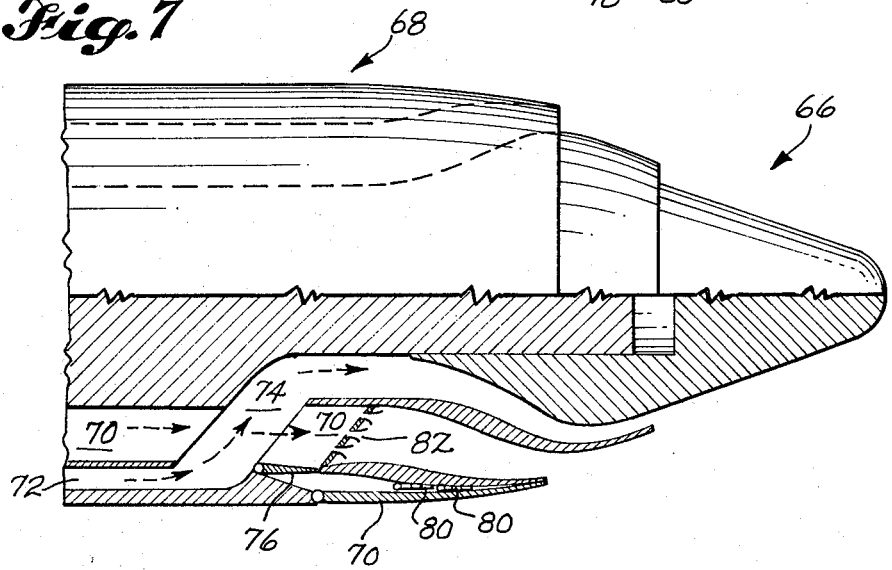

Turning now to FIGS. 6-7 a schematic illustration of the aft portion 66 of an inverted flow engine, generally designated 68, utilizing the shield generator of the invention is shown. As noted previously, inverted flow engines merely reverse the relative positions of the hot primary or core flow and the cooler secondary or fan flow. This may be accomplished, for example, as shown in FIG. 6. Primary flow duct 70 has a fan duct 72 located outwardly thereof at the forward portion of an engine 68. At some point near aft portion 66, duct 72 is formed into a plurality of radially inwardly extending branches 74. In this way the engine flow is inverted. Since it is most desirable to utilize the hot primary flow for creating the shield, the generator may be aft of branches 74. As before, a pair of door means 76, 78, and at least one throttle plate 80 are provided. Operation, sizing, etc. of this arrangement are the same as discussed with regard to the embodiment of FIGS. 3-5. A flame holder 82 may be provided in primary duct 70, aft of door means 76 if afterburning is desired. Again, any of a variety of known actuators and linkage arrangements may be provided to move door means 76, 78 and plates 80 between their operative and inoperative positions.

FIGS. 8-13 illustrate an embodiment of the invention wherein shield generation, thrust reversal and a variation in nozzle geometry all may be accomplished through common structure. A section of the exhaust portion, generally designated 84, of a turbojet engine intended for use on an aircraft capable of supersonic flight is illustrated. In engines of this type it is common to provide some means to vary the exhaust nozzle throat area, generally designated 86. This may be accomplished, for example, by imparting a translating motion to tail plug 88, in cooperation with a movable member 90 and a shroud 92. Other state-of-the-art means (not shown) for varying the throat area could also be used. Since neither the means for moving plug 88 and member 90, nor the function of such nozzle area variation form part of the instant invention, they will not be discussed further. Formed between plug 88 and outer casing 94 is an exhaust duct 96. A guide means or track 98 is provided in casing 94 and an assembly, generally designated 100, which includes reversing cascades or turning vanes 102 and shroud 92 is mounted therein. Assembly 100 is selectively moved forwardly or rearwardly along guide means 98 by one or more actuators 104 which may be, for example, worm gear arrangements or fluid-type actuators. As discussed previously, a shielding layer may be produced by providing door means 106 pivotally or otherwise movably attached at 108 to the inside of casing 94, i.e., that side of casing 94 facing exhaust duct 96. One or more passages 110 are provided in casing 94 between duct 96 and cascades 102 for purposes to be described infra. Passages 110 may be selectively opened or closed to duct 96 by door means 106. Radially outwardly from cascades 102 is one or more recesses 112 provided in casing 94 and forming a continuation of passage 110. Pivotally or otherwise movably secured, as at 114, to the aft portion of casing 94 adjacent recess 112 is a second door means 116. Throttle or choke plates 118 may again be provided in one or more tiers within a nozzle 120 formed between door means 116 and a member 122, forming a portion of guide means 98, when door means 116 is in its open, operative position. Actuation of door means 106, 116 may again be accomplished by any of a variety of conventional arrangements as discussed above.

In the cruise position shown in FIG. 8, door means 106 and 116 are in their closed, inoperative positions and the entire exhaust flow, indicated by arrows 124, exits through engine exhaust nozzle 86. When noise suppression is desired and door means 106, 116 are moved to their open, operative positions, a small quantity of exhaust 124 is diverted into passage 110, past throttling means 118 and out through nozzle 120 to form the shielding layer. As seen in FIG. 10, this same structure may be moved to another position to provide thrust reversal. This is accomplished by latching aft guide body 126 and door assembly 128 to shroud 92 then moving assembly 100 aft along guide means 98. With the guide body in abutting relation with movable member 90, a path through cascades or turning vanes is the only way for exhaust 124 to exit the engine. As the flow passes cascades 102 it is turned to provide a component of reverse thrust. An embodiment of a novel latching arrangement will now be discussed with reference to FIGS. 11-13.

Figure 11:
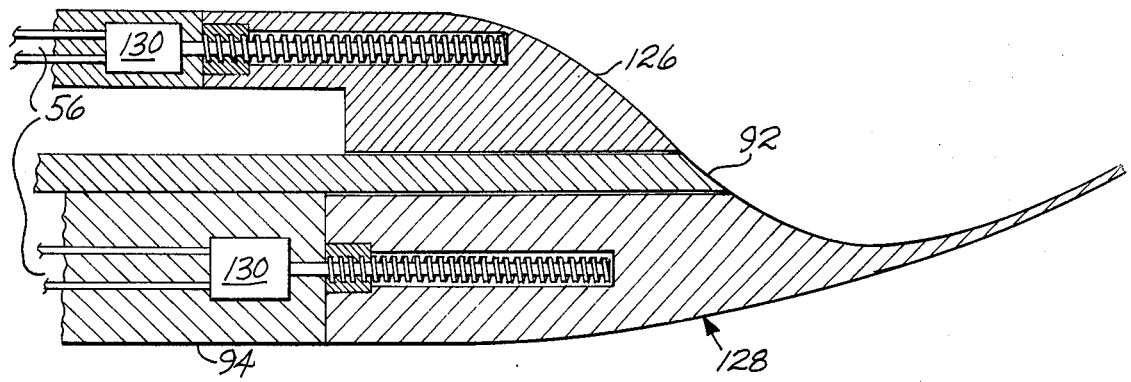
Figure 12:
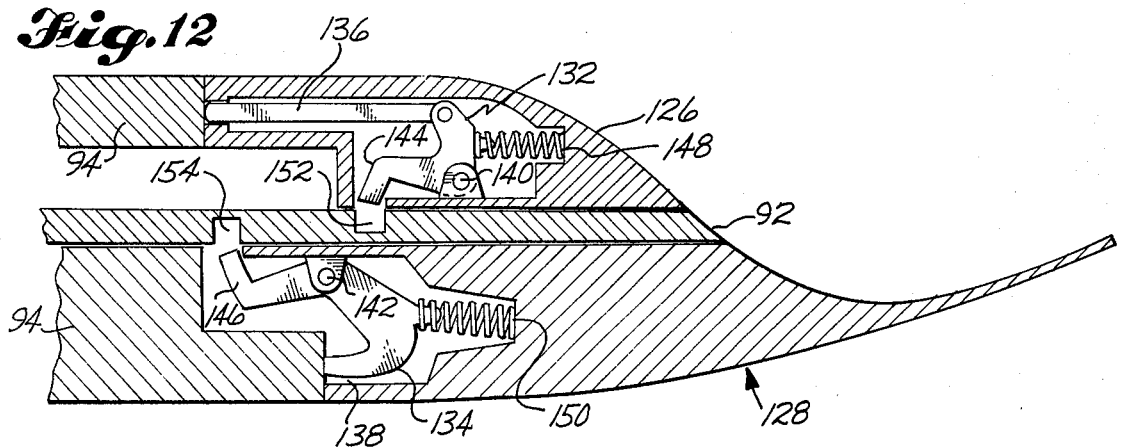
Figure 13:
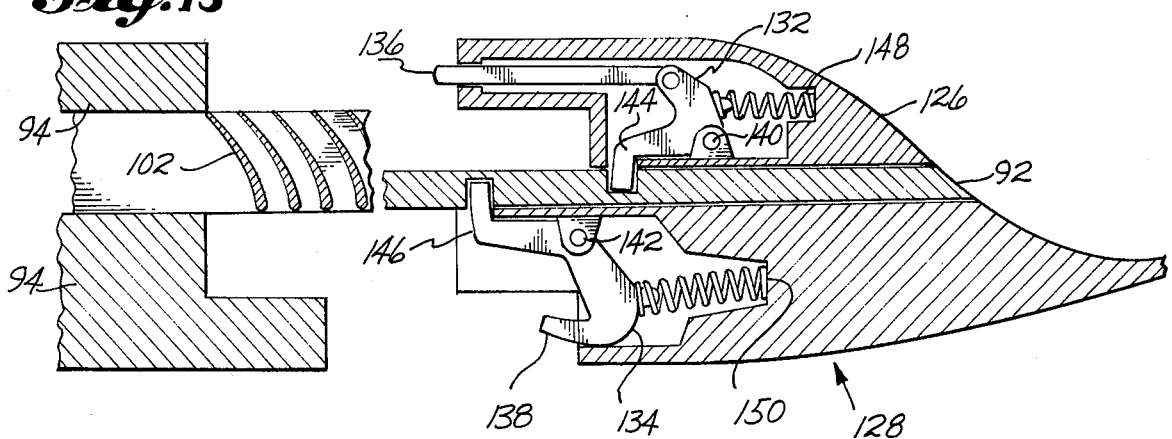

FIG. 11 shows one type of actuator that may be used to translate body 126 and assembly 128 to and from the thrust reversing position. A pair of screw-jacks 130 may be provided at a plurality of circumferentially spaced locations about the periphery of the engine. At other locations offset from those carrying actuators 130 are located pairs of opposed latch means 132, 134, such as shown in FIGS. 12 and 13. Each latch means includes an actuator portions 136, 138, pivots 140, 142, a latch portions 144, 146 and a biasing means 148, 150. An appropriately shaped and sized recess 152, 154 is provided in shroud 92 to receive the respective latching portion 144, 146. When body 126 and assembly 128 are drawn tightly against casing 94 by screw-jacks 130, the actuator portion 136 and 138 of each latching means 132, 134 moves against the force of its respective biasing means 148, 150 to withdraw latch portions 144, 146 from its respective recess 152, 154. Shroud 92 is then free to move with respect to body 126 and assembly 128. This position will be maintained for all modes of operation except thrust reversing. In the thrust reverse mode, jacks 130 will be actuated along control lines 156 from a source (not shown) to drive body 126 and assembly 128 away from casing 94. As body 126 and assembly 128 begin to move, biasing means 148, 150 will be unopposed by actuator portions 136, 138 and will therefor move latching portions 144, 146 into their respective recess 152, 154. Shroud 92 and cascades 102 will then be drawn along with body 126 and assembly 128 to the thrust reversing position shown in FIG. 10.

Turning now to FIG. 14, there is shown a slightly different, simplified embodiment of the novel shield generator. Again there is shown a section of an exhaust portion 158 of an engine 160. In this embodiment pressure loss producing means in the form of a fixed throttling means 162 is provided. As before, the number or stages of throttling means 162 required will depend upon the decrease in pressure to be achieved. As before, a shroud-cascade assembly 164 may move relative to a guide body 166 or may be connected thereto for joint movement by a latch means similar to those discussed with regard to FIGS. 8-13.

There has thus been disclosed and described a simplified method and apparatus for generating a noise suppressing gas shield layer in a jet engine which exhibits the advantages and achieves the objects set forth hereinabove. Variations and modifications will occur to persons skilled in the art without departing from the spirit and scope of the invention. Accordingly, it is intended the appended claims cover all such variations and modifications.

What is claimed is:

1. A method of suppressing the noise of a jet engine having an exhaust duct through which the hot exhaust flow passes comprising the steps of
    forming a shield duct adjacent said exhaust duct,
    deflecting a portion of said hot exhaust flow from its path,
    directing said deflected portion into said shield duct,
    reducing the pressure of said deflected portion as said portion passes through said shield duct
    ejecting said portion to the atmosphere from said shield duct at a location downstream of that where said pressure reduction occurs to form a sound suppressing fluid layer.

2. A method as claimed in claim 1 wherein said step of forming a shield duct includes selectively moving duct forming means into their open, operative positions.

3. A method as claimed in claim 2 wherein said shield duct is formed about less than the full 360 degree circumference of said exhaust duct.

4. A method as claimed in claim 2 wherein said deflecting step comprises selectively moving door means from their closed position, wherein they form part of said exhaust duct, to their open position, wherein fluid communication is established between said exhaust duct and said shield duct.

5. A method as claimed in claim 1 or 2 wherein said reducing step includes passing said deflected portion through flow throttling means.

6. A method as claimed in claim 5 wherein said throttling means comprises at least one throttle plate.

7. A method as claimed in claim 1 wherein said ejecting step includes ejecting said portion at a location radially adjacent said exhaust flow.

8. A method as claimed in claim 1 wherein said step of deflecting comprises deflecting substantially only the boundary layer of said hot exhaust flow.

9. Means for suppressing the noise of a jet engine having an exhaust duct through which passes a hot exhaust flow, comprising,
    means forming a shield duct open to the atmosphere at an exit end thereof at least part way around the circumference of said exhaust duct,
    means upstream of the exit of said shield duct for reducing the pressure of a fluid flow passing therethrough, and
    means for permitting at least some of said exhaust flow to enter said shield duct means, whereby said flow passes through said pressure reducing means and is then expelled to the atmosphere to form a noise suppressing fluid shield layer.

10. Means for suppressing noise as claimed in claim 9 wherein said shield duct forming means comprise means selectively movable between an open, operative position and a retracted, closed position.

11. Means for suppressing noise as claimed in claim 10 wherein said means for deflecting comprise door means selectively movable between a closed position, wherein said door means form a portion of one side of said exhaust duct, and an open position, wherein said exhaust duct and said shield duct are placed in fluid communication.

12. Means for suppressing noise as claimed in claim 9 wherein said means for reducing the pressure comprises throttle plate means.

13. Means for suppressing noise as claimed in claim 9 wherein said means for reducing pressure comprises flow turning means connected to plenum chamber means.

* * * * *